United States Patent
Tsukagoshi

(10) Patent No.: US 11,272,148 B2
(45) Date of Patent: Mar. 8, 2022

(54) CONTROL METHOD FOR PROJECTOR AND PROJECTOR

(71) Applicant: SEIKO EPSON CORPORATION, Tokyo (JP)

(72) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/160,451

(22) Filed: Jan. 28, 2021

(65) Prior Publication Data

US 2021/0235051 A1 Jul. 29, 2021

(30) Foreign Application Priority Data

Jan. 28, 2020 (JP) .............................. JP2020-011414

(51) Int. Cl.
*H04N 9/31* (2006.01)
*G06F 21/84* (2013.01)
*G03B 21/20* (2006.01)
*G03B 21/14* (2006.01)

(52) U.S. Cl.
CPC ......... *H04N 9/3188* (2013.01); *G03B 21/142* (2013.01); *G03B 21/147* (2013.01); *G03B 21/208* (2013.01); *G06F 21/84* (2013.01); *H04N 9/317* (2013.01); *H04N 9/3185* (2013.01); *H04N 9/3194* (2013.01)

(58) Field of Classification Search
CPC .... G03B 21/006; G03B 21/008; G03B 21/28; G03B 21/147; G03B 21/208; G03B 21/2013; G03B 21/2033; G03B 21/2053; G03B 21/2066; G03B 13/20; G03B 13/36; H04N 9/31; H04N 9/315; H04N 9/317; H04N 9/3152; H04N 9/3185; H04N 9/3194; G06F 21/042; G06F 21/31; G06F 21/84; G06F 21/147
See application file for complete search history.

(56) References Cited

U.S. PATENT DOCUMENTS

| 10,564,535 | B2 * | 2/2020 | Hirayama | .......... G03B 21/2033 |
| 2015/0138513 | A1 * | 5/2015 | Ichieda | ................ H04N 9/3185 |
| | | | | 353/70 |
| 2018/0033123 | A1 * | 2/2018 | Narimatsu | ........... G03B 21/142 |

FOREIGN PATENT DOCUMENTS

| JP | 2005-018323 A | 1/2005 |
| JP | 2006-048492 A | 2/2006 |
| JP | 2008-217669 A | 9/2008 |
| JP | 2010-170497 A | 8/2010 |

(Continued)

*Primary Examiner* — Sultan Chowdhury
(74) *Attorney, Agent, or Firm* — Dority & Manning, P.A.

(57) ABSTRACT

An image including an input field for a password is projected onto a screen by a projection device including an optical system for adjusting a focal length and projection range. A control signal transmitted from a remote controller is received by at least one of a first receiving device and a second receiving device. A character of the password input to the input field is determined from the control signal by a control circuit. The projection device is controlled to project, according to a combination a size a projection surface in the screen calculated from the focal length and the projection range and a position of the remote controller determined from the control signal, a reduced character obtained by reducing a size of the character to a size smaller than a reference size in the input field.

7 Claims, 7 Drawing Sheets

(56) References Cited

FOREIGN PATENT DOCUMENTS

| | | |
|---|---|---|
| JP | 2012-185718 A | 9/2012 |
| JP | 2015-162044 A | 9/2015 |
| JP | 2016-053899 A | 4/2016 |
| JP | 2018-136627 A | 8/2018 |

* cited by examiner

CONTROL METHOD FOR PROJECTOR AND PROJECTOR

The present application is based on, and claims priority from JP Application Serial Number 2020-011414 filed Jan. 28, 2020, the disclosure of which is hereby incorporated by reference herein in its entirety.

BACKGROUND

1. Technical Field

The present disclosure relates to a control method L a projector and the projector.

2. Related Art

JP-A-2016-53899 (Patent Literature 1) discloses an apparatus that analyzes source information, which is a source of information to be displayed on a screen, to discriminate an input area and processes the source information. to make it hard to see information such as a password input the input area by a keyboard.

When the technique described in Patent Literature 1 is applied to a projector, since the information such as the password is uniformly displayed on a relatively large screen, confidentiality of the password is sometimes deteriorated. On the other hand, when ne password is completely hidden, operability in the password input is deteriorated.

SUMMARY

An aspect is directed to a control method for a projector including an optical system for adjusting a focal length and a projection range, the control method including: projecting an image including an input field for a password onto a screen; detecting, with a sensor, the focal length and the projection range of the image based on setting of the optical system; receiving, with at least one of a first receiving device or a second receiving device disposed in a position different from a position of the first receiving device in a direction from the projector to the screen, a control signal, which is an electromagnetic wave, transmitted from a remote controller; determining, from the control signal, a character of the password input to the input field; and projecting, according to a combination of a size of a projection surface in the screen calculated based on the focal length and the projection range and a position of the remote controller determined from the control signal, a reduced character obtained by reducing a size of the character to a size smaller than a reference size in the input field.

Another aspect is directed to a projector including: a projection device including an optical system for adjusting a focal length and a projection range and configured to project an image including an input field for a password onto a screen; a sensor configured to detect the focal length and the projection range of the image from setting of the optical system; a first receiving device; a second receiving device disposed in a position different from a position of the first receiving device in a direction from the projection device to the screen; and a control circuit configured to determine, from an electromagnetic wave transmitted from a remote controller, the electromagnetic wave being a control signal received by at least one of the first receiving device and the second receiving device, a character of the password input to the input field, the control circuit controlling, accord trig to a combination of a size of a projection surface in the screen calculated from the focal length and the projection range and a position of the remote controller determined from the control signal, the projection device to project a reduced character obtained by reducing a size of the character to a size smaller than a reference size in the input field.

DESCRIPTION OF EXEMPLARY EMBODIMENTS

Figure 1:
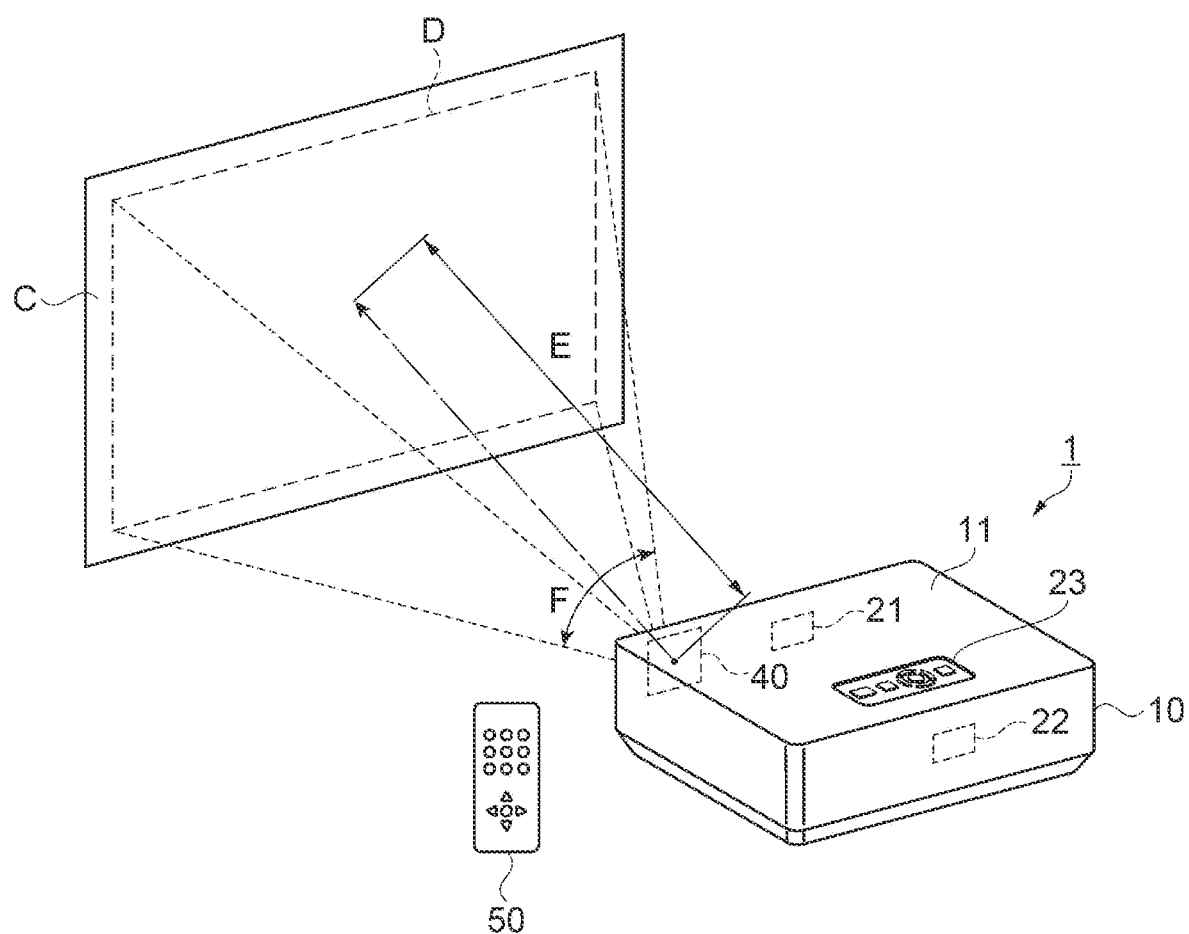
FIG. 1 is a perspective view for explaining a projector according to an embodiment.

As shown in FIG. 1, a display system 1 according to an embodiment includes, for example, a projector 10 and a remote controller 50. The projector 10 projects an image D onto a screen C. The remote controller 50 transmits a control signal, which is an electromagnetic wave, according to, for example, operation by a user. The projector 10 is controlled by the control signal transmitted from the remote controller 50. As the screen C, planes such as a roll screen and a whiteboard are adoptable.

The projector 10 includes a housing 11, a first receiving device 21, a second receiving device 22, an input device 23, and a projection device 40. The housing 11 schematically has, for example, a rectangular parallelepiped shape. The housing 11 is a case that stores components of the projector 10 on the inside. Each of the first receiving device 21 and the second receiving device 22 is a receiver that receives a control signal transmitted from the remote controller 50.

The input device 23 is input equipment that receives operation by the user. As the input device 23, various input devices such as a push button, a touch sensor, a keyboard, and a pointing device are adoptable. The projection device 40 projects the image D onto the screen C by emitting light representing the image D forward. In FIG. 1, a portion that emits light to the outside from the housing 11 is illustrated as the projection device 40.

The first receiving device 21 is disposed in a front part of the housing 11. The second receiving device 22 is disposed in a rear part of the housing 11. That is, the second receiving device 22 is disposed in a position different from a position of the first receiving device 21 in a direction from the projection device 40 to the screen C. The direction from the projection device 40 to the screen C is, for example, a direction along an optical axis of the light representing the image D indicated by an alternate long and short dash line in FIG. 1. For example, the first receiving device 21 is disposed to face the front and the second receiving device 22 is disposed to face the rear. The input device 23 is disposed in the housing 11 to be exposed to the outside of the housing 11.

Figure 2:
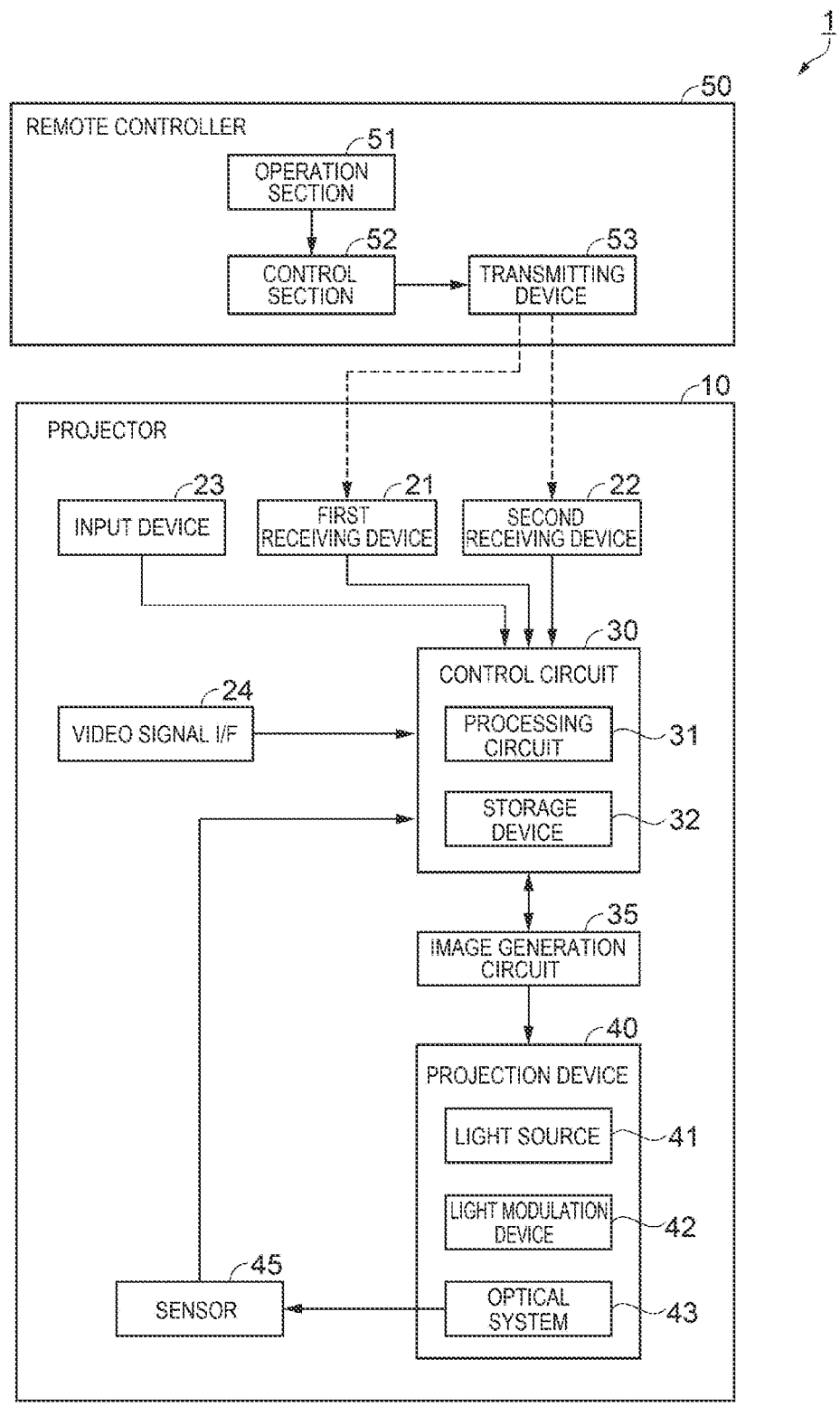
FIG. 2 is a block diagram for explaining a basic configuration of the projector according to the embodiment.

As shown in FIG. 2, the remote controller 50 includes an operation section 51, a control section 52, and a transmitting device 53. The operation section 51 is input equipment that receives operation by the user. The operation section 51 includes a plurality of switches such as buttons and touch sensors. The operation section 51 identifies various kinds of operation by the user according to operation patterns such as the buttons, combinations of the buttons and pressing times of the buttons. The operation section 51 outputs an operation signal corresponding to the operation by the user to the control section 52.

The control section 52 is an integrated circuit that controls the transmitting device 53 to transmit a control signal corresponding to the operation signal input from the operation section 51. The control section 52 generates a control signal corresponding to the operation signal and outputs the control signal to the transmitting device 53. The transmitting device 53 transmits, according to the control by the control section 52, a control signal, which is an electromagnetic wave, to the projector 10. The electromagnetic wave transmitted by the transmitting device 53 is, for example, an infrared ray.

The projector 10 further includes a video signal interface (I/F) 24, a control circuit 30, an image generation circuit 35, and a sensor 45. For example, the video signal I/F 24 receives input of a video signal via a communication link between the video signal I/F 24 and not-shown another device and outputs the video signal to the control circuit 30. The communication link may be either a wired communication link or a wireless communication link and may be a combination of the wired communication link and the wireless communication link. The video signal I/F 24 can include, for example, an antenna that receives a signal by radio, a receptacle into which a plug of a cable for transmitting the signal is inserted, and a communication circuit that processes the signal.

The control circuit 30 includes a processing circuit 31 and a storage device 32. The processing circuit 31 configures a processing device of a computer that processes an arithmetic operation necessary for the operation of the projector 10. The processing circuit 31 realizes functions described in the embodiment by, for example, executing a control program stored in the storage device 32. As a processing device configuring at least a part of the processing circuit 31, logical operation circuits such as a central processing unit (CPU) a digital signal processor (DSP), a programmable logic device (PhD) and an application specific integrated circuit (ASIC) are adoptable. The processing circuit 31 may be configured from integral hardware or may be configured from a separate plurality of kinds of hardware.

The storage device 32 is a computer-readable storage medium that stores a control program indicating a series of processing necessary for the operation of the projector 10 and various data. As the storage device 32, for example, a semiconductor memory is adoptable. The storage device 32 is not limited to a nonvolatile auxiliary storage device and can include a volatile main storage device such as a register or a cache memory incorporated in the CPU. The storage device 32 may be configured from integral hardware or may be configured from a separate plurality of kinds of hardware.

The image generation circuit 35 generates, according to control by the processing circuit 31, an image signal indicating the image D to be projected onto the screen C and outputs the image signal to the projection device 40. The image generation circuit 35 may generate an image signal indicating computer graphics generated by a control program of the control circuit 30 or may generate an image signal from a video signal input from an external device via the video signal I/F 24. The image generation circuit 35 outputs sequentially generated image signals to the projection device 40. The image generation circuit 35 includes a rendering engine and a graphics memory. The image generation circuit 35 may function as a circuit configuring a part of the control circuit 30.

The projection device 40 includes a light source 41, a light modulation device 42, and an optical system 43. The light source 41 includes a light emitting element such as a discharge lamp or a solid state light source. The light modulation device 42 includes a light valve such as a liquid crystal light valve including a plurality of pixels. The light modulation device 42 modulates light emitted from the light source 41. The optical system 43 adjusts a focal length F and a projection range F of the light modulated by the light modulation device 42 and projects the light onto the screen C as the image D.

Figure 3:
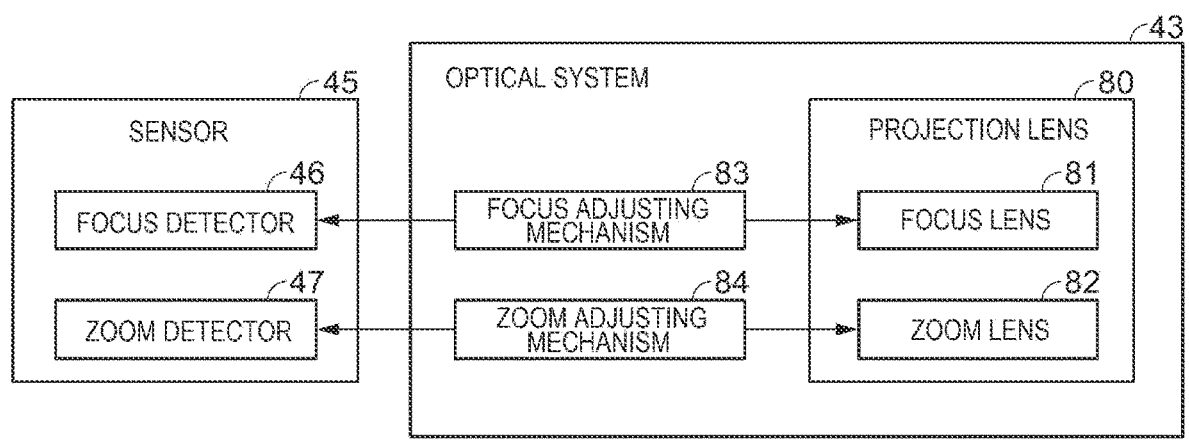
FIG. 3 is a block diagram for explaining a basic configuration of an optical system.

As shown in FIG. 3, the optical system 43 includes a projection lens 80 including a focus lens 81 and a zoom lens 82, a focus adjusting mechanism 83, and a zoom adjusting mechanism 84. The focus adjusting mechanism 83 adjusts the focal length E of the image D by driving the focus lens 81 along the optical axis of the image D. In this embodiment, the focal length E can be regarded as a projection distance, which is the distance between the projection lens 80 and the screen C. The focus adjusting mechanism 83 includes, for example, a motor driven according to a driving signal output from the control circuit 30 and a gear that transmits the driving of the motor to the focus lens 81. The focus adjusting mechanism 33 may have a configuration for manually driving the focus lens 81 by being directly operated by the user.

The zoom adjusting mechanism 84 adjusts the projection range F of the image D by driving the zoom lens 82 along the optical axis of the image D. In this embodiment, the projection range F is equivalent to zoom magnification of the image D to be projected. The zoom adjusting mechanism 84 includes, for example, a motor driven according to a driving signal output from the control circuit 30 and a gear that transmits the driving of the motor to the zoom lens 82. The zoom adjusting mechanism 84 may have a configuration for manually driving the zoom lens 82 by being directly operated by the user.

The sensor 45 detects the focal length E and the projection range F of the image D from the setting of the optical system 43. The sensor 45 includes, for example, a focus detector 46 that detects the foal length E based on displacement from a reference position of the focus adjusting mechanism 83 and a zoom detector 47 that detects the projection range F based on displacement from a reference position of the zoom adjusting mechanism 84. Each of the focus detector 46 and the zoom detector 47 can be inexpensively configured by a variable resistor. The sensor 45 may detect the focal length E and the projection range F using another detector such as an encoder or may detect the focal length E and the projection range F based on a driving signal of the control circuit 30.

The control circuit 30 calculates a size of a projection surface in the screen C from the focal length E and the projection range F detected by the sensor 45. The projection surface means a range occupied by the projected image D on the screen C. A size of the projection surface can be calculated from, for example, the focal length F and the protection range F associated with each other in advance in the control circuit 30.

The control circuit 30 determines the position of the remote controller 50 from the control signal received by at least one of the first receiving device 21 and the second receiving device 22. The position of the remote controller 50 determined in this embodiment means whether the position is on the screen C side based on the position of the projector 10. More specifically, the position of the projector 10 is defined as, for example an intermediate position on between the first receiving device 21 and the second receiving device 22. The control circuit 30 determines the position of the remote controller 50 from for example, electric field intensity of the control signal received by each of the first receiving device 21 and the second receiving device 22.

For example, when the electric field intensity of the control signal received by the first receiving device 21 is higher than the electric field intensity of the control signal received by the second receiving device 22, it is determined that the position of the remote controller 50 is the front of the projector 10. On the other hand, when the electric field intensity or the control signal received by the second receiving device 22 is higher than the electric field intensity of the control signal received by the first receiving device 21, it is determined that the position of the remote controller 50 is the rear of the projector 10. When the electric field intensity of the control signal received by each of the first receiving device 21 and the second receiving device 22 is the same degree, it can be regarded that the control signal reflected by the screen C is received by the first receiving device 21. Accordingly, it is determined that the position of the remote controller 50 is the rear of the projector 10. Alternatively, when the electric field intensity of the control signal received by each of the first receiving device 21 and the second receiving device 22 is the same degree, it may be determined that the position of the remote controller 50 is a side of the projector 10.

Figure 4:
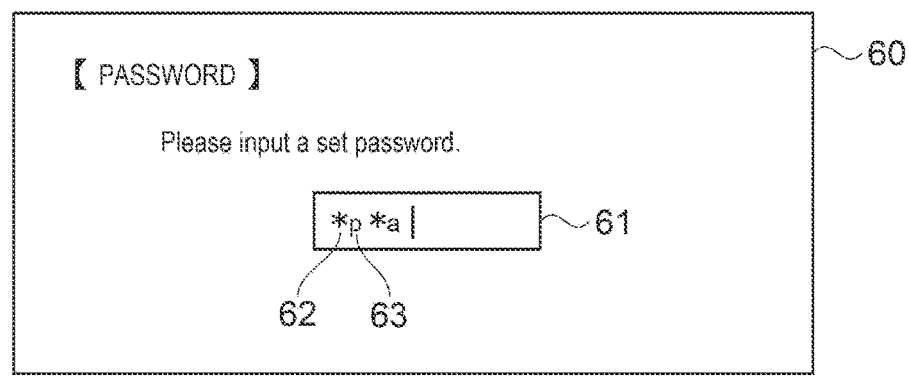
FIG. 4 is a diagram for explaining an example of an input screen.

FIG. 4 is a diagram showing an example of the image D projected by the projector 10 for input of a password. As shown in FIG. 4, the control circuit 30 generates, according to operation by the user on the remote controller 50 or the input device 23, an input screen 60 including an input field 61 for a password. The projection device 40 projects, according to control by the control circuit 30, the image D including the input screen 60 onto the screen C. The control circuit 30 determines characters of a password input to the input field 61 from the control signal received by at least one of the first receiving device 21 and the second receiving device 22. That is, the user can input the characters of the password to the input field 61 using the remote controller 50.

In the example shown in FIG. 4, a sign 62 having a reference size in the input field. 61 and a reduced character 63 having a size smaller than the reference size are projected. The sign 62 conceals a character of the password to thereby mean that the password is being input. That is, the projection of the sign 62 can inform people other than the user that the password input is being performed in the input field 61. The sign 62 is, for example, an asterisk (*).

Figure 5:
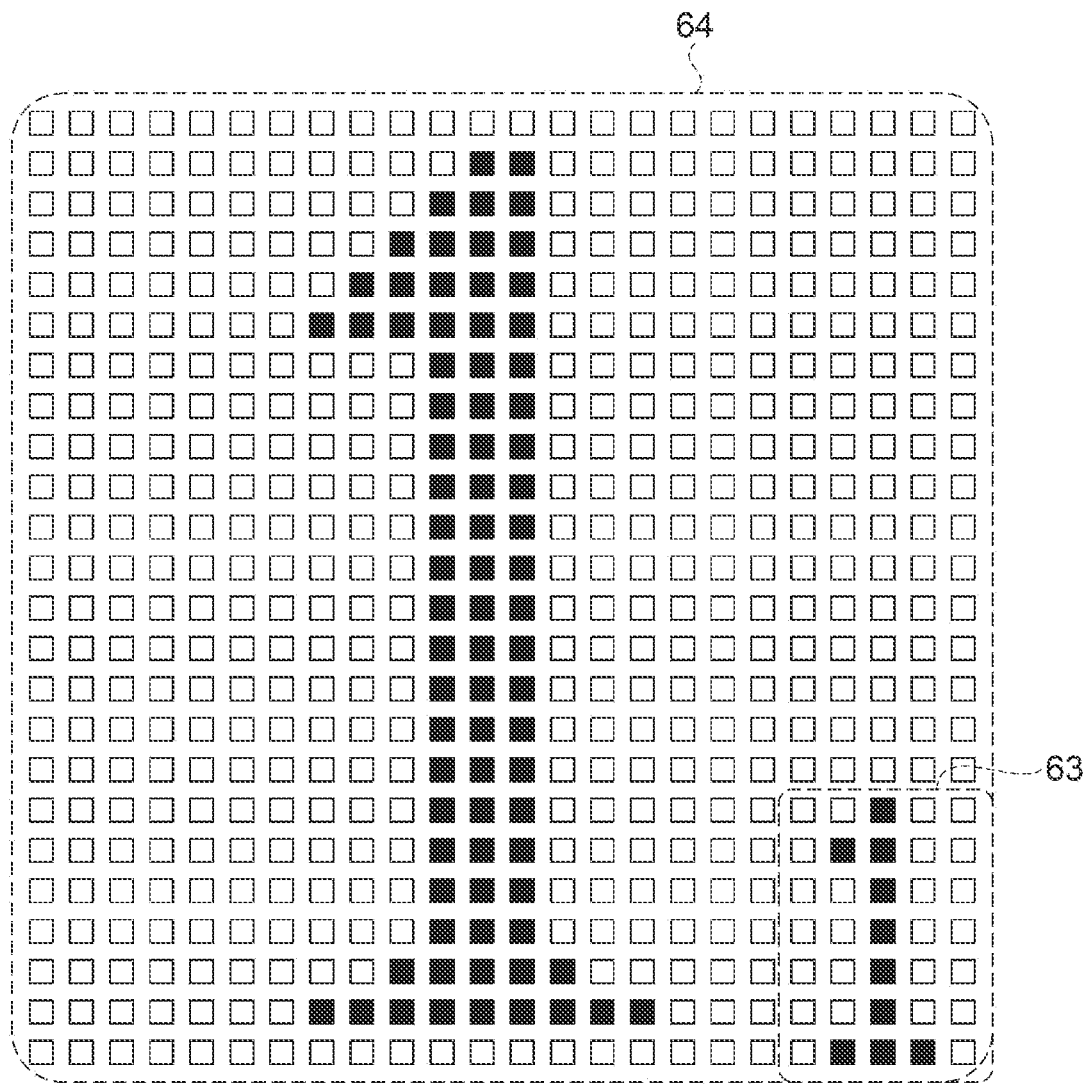
FIG. 5 is a diagram for explaining an example of a reduced character.

FIG. 5 is a diagram showing an example of a reference character 64 and the reduced character 63 displayed in the input field 61. As shown in FIG. 5, the reduced character 63 is, for example, a character obtained by reducing the reference character 64 having a reference size. For example, when the resolution of the image D is full HD, that is, 1920×1080, the reference size can be set to approximately several ten pixels each vertically and horizontally. In the example shown in FIG. 5, the number of pixels of the reference character 64 is 24×24 and the number of pixels of the reduced character 63 is 5×7. For example, when the image ID of the full HD is projected on a projection surface having diagonal lines of approximately 100 inches, the height of the reduced character 63 having the number of pixels of 5×7 is approximately 7 mm. In this case, it is difficult to visually recognize the reduced character 63 from a distance of several meters. Such height of the reduced character 63 is, for example, approximately 1 mm in a 15-inch liquid crystal display. It is difficult to visually recognize the reduced character 63 even at a short distance.

When the size of the projection surface exceeds a threshold and characters having the reference size are input to the input field 61 as a password, it is highly likely that the characters are visually recognized by people other than the user. When the position of the remote controller 50 is located in the front of the projector 10, that is, on the screen C side, it can be assumed that the user is present near the screen C. If the user is present near the screen C, it can be assumed that it is highly likely that the reduced character 63 projected onto the screen C is visually recognized by the user. If the reduced character 63 is visually recognizable by the user, since the user can confirm characters input by the remote controller 50, operability in the password input can be improved.

The control circuit 30 controls, according to a combination of the size of the projection surface in the screen C and the position of the remote controller 50, the projection device 40 to project the reduced character 63, which is the character having the size smaller than the reference size in the projection surface exceeds the threshold and the position of the remote controller 50 is on the screen C side based on the position of the projector 10, the control circuit 30 controls the projection device 40 to project the reduced character 63. Since the reduced character 63 is projected in a limited situation this way, the projector 10 can improve the operability in the password input while suppressing deterioration in confidentiality of the password.

In the example shown in FIG. 4, already-input one character among the characters forming the password is represented by a pair of the sign 62 and the reduced character Consequently, the user can input the password while confirming the number of already-input characters of the password and the characters of the password. Accordingly, the operability in the password input is improved. The pair of the sign 62 and the reduced character 63 may be arranged in regions adjacent to each other or may be arranged in regions superimposed each other like the reduced character 63 and the reference character 64 shown in FIG. 5.

Figure 6:
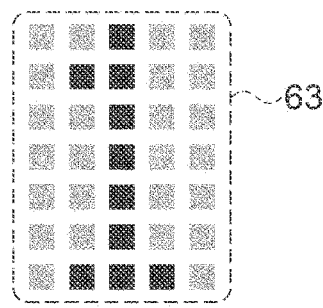
FIG. 6 is a diagram for explaining another example of the reduced character.

As shown in FIG. 6, contrast and a color scheme of the reduced character 63 are adjusted, whereby the reduced character 63 may have visibility lower than the visibility of the reference character 64. The reduced character 63 has a degree of visibility for allowing the reduced character 63 to be visually recognized by only the user present near the screen C. Consequently, it is possible to further suppress deterioration in the confidentiality of the password.

Figure 7:
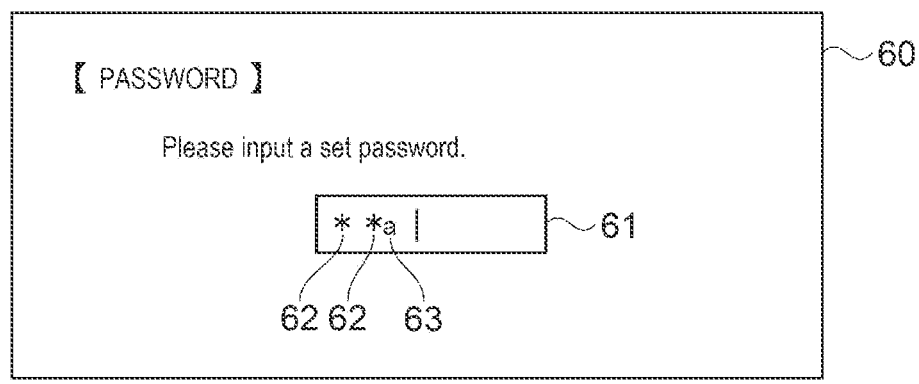
FIG. 7 is a diagram for explaining another example of the input screen.

As shown in FIG. 7, the reduced character 63 may be selectively projected concerning an undecided character. A first sign 62 of two signs 62 shown in FIG. 7 means an already-decided character. In this way, concerning a character being input and undecided, the control circuit 30 may project the sign 62 and the reduced character 63 until the character is decided and erase the reduced character 63 according to the decision of the character. Consequently, it is possible to further suppress deterioration in the confidentiality of the password.

Figure 8:
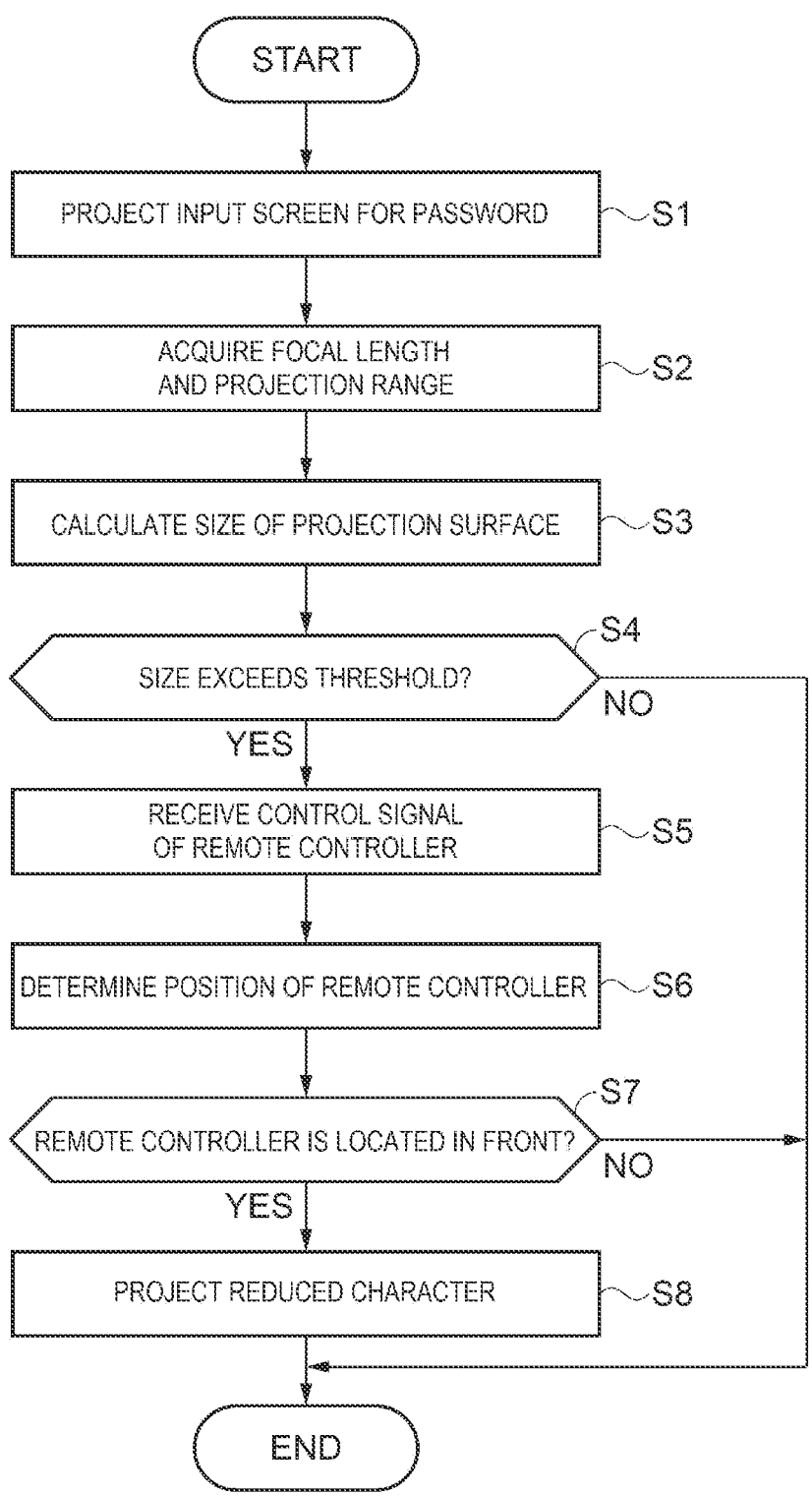
FIG. 8 is a flowchart for explaining a control method for the projector according to the embodiment.

An example of operation of input processing for a password performed by the projector 10 is explained below as a control method for the projector 10 with reference to a flowchart of FIG. 8. A series of processing shown in FIG. 8 is, for example, started according to specific operation by the user on the remote controller 50 or the input device 23 and repeatedly executed at a fixed period.

First, in step 31, the control circuit 30 controls the projection device 40 to project the image D including the input screen 60 for a password onto the screen C. In step S2, the control circuit 30 acquires the focal length E and the projection range F detected by the sensor 45. In step S3, the control circuit 30 calculates a size of the projection surface in the screen C from the focal length E and the projection range F acquired in step S2.

In step S4, the control circuit 30 determines whether the size of the projection surface calculated in step S3 exceeds the threshold. The threshold is, for example, a size with diagonal lines of the projection surface set to 100 inches. The threshold can be changed according to the resolution of the image D, the focal length E, and the like. When the size of the projection surface exceeds the threshold, the control circuit 30 advances the processing to step S5. When the size of the projection surface does not exceed the threshold, the control circuit 30 ends the processing.

In step S5, at least one of the first receiving device 21 and the second receiving device 22 receives a control signal transmitted from the remote controller 50. The control circuit 30 determines, from the control signal received in step S5, characters of a password input to the input field 61. In step S6, the control circuit 30 determines a position of the remote controller 50 from the control signal received in step S5. That is, the control circuit 30 determines the position of the remote controller 50 by comparing electric field intensity of the control signal received by the first receiving device 21 and electric field intensity of the control signal received by the second receiving device 22.

In step S7, the control circuit 30 determines whether the position of the remote controller 50 determined in step S6 is the front of the projector 10. When the position of the remote controller 50 is the front of the projector 10, the control circuit 30 advances the process ng to step S8. When the position of the remote controller 50 is not the front of the projector 10, the control circuit 30 ends the processing.

In step S8, the control circuit 30 controls the projection device 40 to project the reduced character 63, which is the character having the size smaller than the reference size in the input field 61. The reduced character 63 is, for example, the character determined by the control signal received in step S5.

In general, the operation section 51 of the remote controller 50 used in the projector 10 includes buttons fewer than buttons of an input device such as a keyboard. When inputting a password including alphanumeric characters using such a remote controller 50, the user needs to select a character by pressing the same button a plurality of times. In an example shown in FIG. 7, the pair of the sign 62 and the reduced character 63 are displayed as "*a". In this case, the sign 62 and the reduced character 63 are changed in order as "*b", and "*c" every time a button of the remote controller 50 allocated with three kinds of characters "a", "b", and "c" is pressed. With the projector 10, the reduced character 63 is projected until decision of a character during the password input. Consequently, the operability in the password input is improved. Accordingly, kinds of characters input by the operation section 51 are increased.

The embodiment is explained above. However, the present disclosure is not limited to the disclosures of the embodiment. The components of the sections may be substituted with any components having the same functions. Any components in the embodiment may be omitted or added within the technical scope of the present disclosure. In this way, various alternative embodiments are clarified for those skilled in the art from the disclosures of the embodiment.

For example, in the embodiment explained above, as the processing in step S4 in FIG. 8, the control circuit 30 may determine, according to a combination of the size of the projection surface and the focal length E, whether to advance the processing to step S5. For example, when a projection distance is sufficiently long even if the size of the projection surface is equal to or smaller than the threshold, it is highly likely that a person other than the user is present in front of the projector 10. Accordingly, the control circuit 30 may end the processing, for example, when the focal length E exceeds a predetermined value in step S4.

The control circuit 30 may change the size of the reduced character 63 according to the size of the projection surface. For example, the control circuit 30 may project the reduced character 63, the size of which in the image D is reduced according to an increase in the size of the projection surface exceeding the threshold. Consequently, it is possible to reduce likelihood that the characters of the password are visually recognized by people other than the user and further suppress deterioration in the confidentiality of the password. Alternatively, the control circuit 30 may change the size of the reduced character 63 according to the combination of the size of the projection surface and the focal length E. A minimum value of the number of pixels of the reduced character 63 is 3×5, for example, when the characters of the password are limited to numbers.

Figure 9:
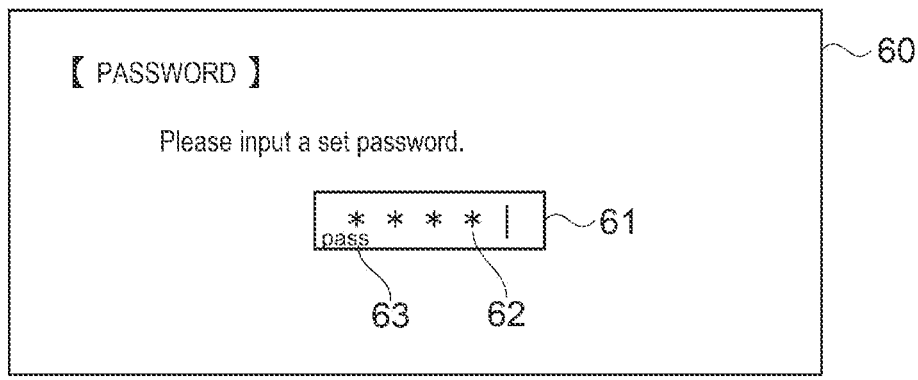
FIG. 9 is a diagram for explaining another example of the input screen.

As shown in FIG. 9, the sign 62 and the reduced character 63 forming a pair may not be arranged adjacent to each other. The reduced character 63 does not need to be displayed in the input field 61 and only has to be displayed in the image D. Alternatively, concerning a character being input and undecided, the control circuit 30 may project the reference character 64 until the character is decided and erase the reference character 64 and project the reduced character 63 according to the decision of the character.

Besides, it goes without saying that the present disclosure includes various embodiments not described above such as configurations obtained by applying the configurations described above to one another. The technical scope of the present disclosure is decided by only the matter to define the invention according to the appended claims reasonable from the above explanation.

What is claimed is:

1. A control method for a projector including an optical system for adjusting a focal length and a projection range, the control method comprising:
   projecting, an image including an input field for a password onto a screen;
   detecting, with a sensor, the focal length and the projection range of the image based on setting of the optical system;
   receiving, with at least one of a first receiving device or a second receiving device disposed in a position different from a position of the first receiving device in a direction from the projector to the screen, a control signal, which is an electromagnetic wave, transmitted from a remote controller;

determining, from the control signal, a character of the password input to the input field; and projecting, according to a combination of a size of a projection surface in the screen calculated based on the focal length and the projection range and a position of the remote controller determined from the control signal, a reduced character obtained by reducing a size of the character to a size smaller than a reference size in the input field.

2. The control method for the projector according to claim 1, further comprising projecting the reduced character when the size of the projection surface exceeds a threshold and the position of the remote controller is on the screen side based on an intermediate position between the first receiving device and the second receiving device.

3. The control method for the projector according to claim 1, further comprising changing the size of the reduced character according to the size of the projection surface.

4. The control method for the projector according to claim 1, wherein the position of the remote controller is determined from electric field intensity of the control signal received by each of the first receiving device and the second receiving device.

5. The control method for the projector according to claim 1, further comprising projecting a sign having the reference size and the reduced character.

6. The control method for the projector according to claim 1, further comprising erasing the reduced character according to decision of the character.

7. A projector comprising:

a projection device including an optical system for adjusting a focal length and projection range and configured to project an image including an input field for a password onto a screen;

a sensor configured to detect the focal length and the projection range of the image from setting of the optical system;

a first receiving device;

a second receiving device disposed in a position different from a position of the first receiving device in a direction from the projection device to the screen; and a control circuit configured to determine, from an electromagnetic wave transmitted from a remote controller, the electromagnetic wave being a control signal received by at least one of the first receiving device and the second receiving device, a character of the password input to the input field, the control circuit controlling, according to a combination of a size of a projection surface in the screen calculated from the focal length and the projection range as a position of the remote controller determined from the control signal the projection device to project a reduced character obtained by reducing a size of the character to a size smaller than a reference size in the input field.

\* \* \* \* \*